Figure 1:
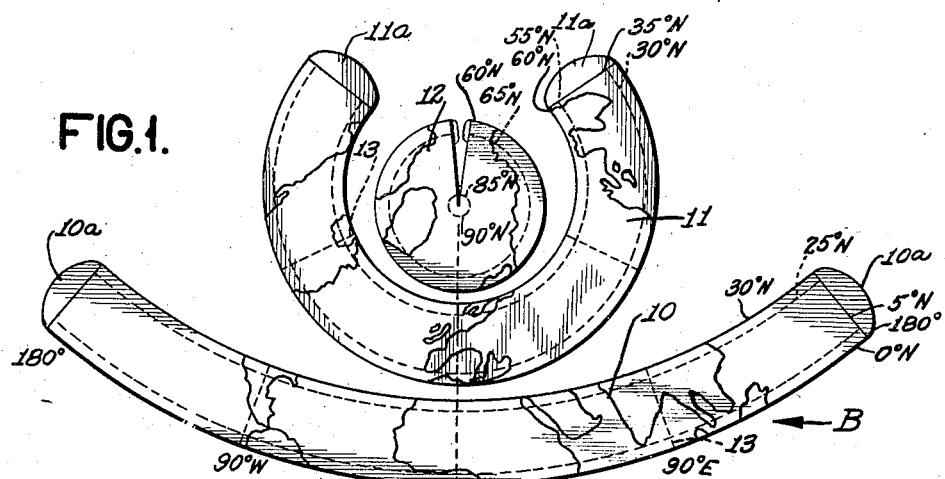

Feb. 6, 1945. A. C. CLARK 2,369,103

GLOBE MAP

Filed July 10, 1942

INVENTOR.
ALLAN C. CLARK
BY
ATTORNEYS

Patented Feb. 6, 1945

2,369,103

UNITED STATES PATENT OFFICE 2,369,103

GLOBE MAP

Allan C. Clark, Manhasset, N. Y., assignor to Pan American Airways, Inc., New York, N. Y., a corporation of New York Application July 10, 1942, Serial No. 450,391

1 Claim. (Cl. 35—46)

This invention relates to maps and globes. It relates particularly to flat map sections which may be detachably assembled upon a support to form globe maps which are highly useful in preparing meteorological charts, in teaching geography and for other scientific and educational purposes.

It is well recognized that it is impossible to illustrate accurately the earth in the form of a flat map because of the impossibility of resolving the surface of a sphere into a plane. Likewise, it is impossible to make globe maps entirely accurate for the reason that the printed sheets which are assembled to form the surface of the globe must be stretched to shape them into conformity with the surface of the globular support. Therefore, such globe and flat maps are, at best, compromises between accuracy and ease of representation.

None of the flat maps showing the entire earth have been entirely satisfactory for the reason that flat world maps unavoidably give a distorted appearance to the oceans and continents and their inherent inaccuracies make it difficult to measure and determine both the direction and distance from one point to another on the surface of the earth.

Globe maps are relatively more accurate than flat maps but have the disadvantage of being permanent in construction, thereby making it difficult if not impossible to revise or change sections of the maps as may be required, for example, when data are to be plotted thereon.

In accordance with the present invention, I have provided a flat map which may be shaped over a support to provide a generally globe-like map, but which can be easily detached from the support to permit replacement of sections thereof or to permit data to be plotted on the sections while in flat form.

More particularly, maps of the type embodying the present invention are formed from a plurality of arcuate sections of material such as for example, heavy paper or the like which may be shaped into conic sections. These conic sections may be assembled on the support to provide a complete globe map formed of a plurality of conic sections of appropriate size and shape. The flat map may be formed as a series of connected or unconnected arcuate sections each of which has a different radius of curvature and has arcuate edges that are of such length and are so shaped that when the strips are assembled in their proper relationship, the adjacent edges of adjacent conic sections will abut accurately.

The map projections can be printed on the strips with such accuracy that the greatest error in the map will not exceed 3½%. Distortions in the shapes of the continents and oceans on the map, therefore, will be inappreciable. The projections used in preparing the map sections may be any one of several types of projections such as, for example, a simple conic projection, a Lambert conformal conic projection with two standard parallels or Albers equal area projection with two standard parallels. The characteristics of such maps are well known and each assures a relatively high degree of accuracy in the map sections.

Maps of the type embodying the present invention have numerous advantages. They may be printed from simple printing plates at a low cost. Sections of the maps may be removed easily if it is desired to plot or alter data thereon and may be replaced upon the support with the assurance that the assembled map will show the data on any section in proper relationship to the other sections. Moreover, inasmuch as the individual map sections are inexpensive, they may be detached and disposed of and replaced with other similar sections so that a complete record of weather data or the like under changing conditions, may be readily prepared and maintained in the form of a world map. Moreover, inasmuch as the data may be plotted on the map sections while in flat form, the task involved in plotting the data is greatly expedited and an accurate visual indication of the data on a world scale can be obtained by assembling the various sections into globe form. For these reasons, my maps are of particular value to meteorologists, and for other scientific and educational purposes.

For a better understanding of the present invention, reference may be had to the accompanying drawing in which Fig. 1 is a form of blank embodying the present invention on which a map of the earth may be printed.

Figure 2:
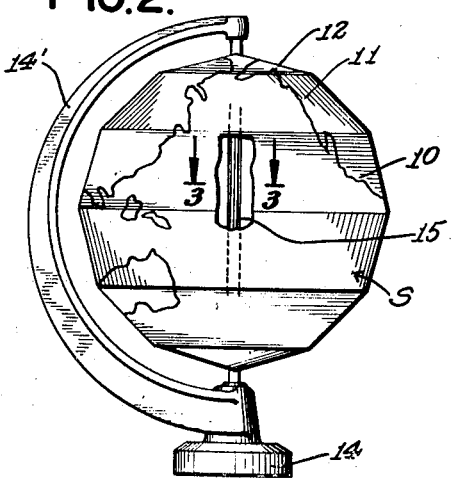
Figure 3:
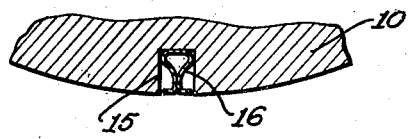

Fig. 2 is a view in side elevation of the support for the map with the map blank assembled thereon; and Fig. 3 is a view in section taken on line 3—3 of Fig. 2 showing a typical form of clip for detachably retaining the map sections on the support.

Illustrative of one form of a map construction embodying the present invention, Fig. 1 discloses a blank B formed of six sections which may be assembled to form a globe map which is formed of six conic sections. I prefer to divide each of the northern and southern hemispheres of the map into three sections, although each hemisphere may be made up of two or more sections. A four section world map is somewhat less accurate than a six section map, although it is entirely satisfactory for many purposes. When more than six sections are used, some difficulty may be encountered in assembling the map, but a higher degree of accuracy is attained.

In the form of blank B, illustrated in Fig. 1, each of the northern and southern hemispheres is represented by three sections 10, 11 and 12. The section 10 is an arcuate strip such as would be provided by the development of a conic section extending between the 0° and 30° north parallels. The section 11 is an arcuate strip such as would be provided by the development of a conic section extending between 30° north and 60° north. The section 12 of the map is an arcuate or semicircular section such as would form a conic section extending from 60° north to 90° north. The southern hemisphere is represented by three sections, 10, 11 and 12, similar to those described above, which are provided by the development of conic sections extending from 0° to 30° south, 30° to 60° south, and 60° to 90° south.

The map projections may be formed upon these strips in accordance with any desired method of calculation but I prefer to use the Lambert conformal conic projection with two standard parallels for the reason that such projections have comparatively high degree of accuracy. Thus the section 10 may be prepared with two standard parallels at 0° and 30° north or 0° and 30° south. The intermediate sections 11 may be 30° north and 60° north or 30° south and 60° south. The standard parallels of the section 12 may be 60° north and 90° north or 60° south and 90° south. The various map sections 10, 11 and 12 need not, however, use these parallels as the standards and in the interest of greater accuracy, I prefer to use other parallels as standards, for example, 5° north and 25° north as the standard parallels for section 10 of the northern hemisphere, 35° north and 55° north for section 11, and 65° north and 85° north for section 12. The standard parallels for the southern hemisphere sections may be similar parallels south. Each of the map projections will be of the same type and therefore inaccuracies which might be introduced by using different methods of projection will not be present in my map.

In preparing a comparatively large map of the earth, the sections 10, 11 and 12 will be of considerable length and therefore it may be desirable to divide these sections into a plurality of sections, for example, along the dotted lines 13 shown thereon, coinciding with the meridians at for example, 0°, 90° west, 180°, and 90° east.

As shown in Fig. 2, the sections 10, 11 and 12 are adapted to be bent around a suitable form of generally globular shape, the outer surface of which is shaped to form a plurality of conic sections corresponding to the shape of the blanks 10, 11 and 12 when they are assembled end to end and edge to edge. The support S may be mounted upon a suitable base 14 and within a meridian arm 14'.

The individual sections 10, 11 and 12 may be retained on the surface of the support S in any desired way, such as for example, by means of pins, clips or tacky adhesive, but I prefer to provide a clip construction which permits ready removal and replacement of the sections 10, 11 and 12. As shown in Figs. 2 and 3, the support S may be provided with one or more grooves 15 therein extending from one pole to the other within which is mounted a series of longitudinally extending spring clips 16. The spring clips are adapted to receive the tabs 10a or 11a on the ends of the arcuate sections 10 and 11 to grip the edges of the sections 10, 11 and 12 themselves, and retain these sections in position, when the tabs are bent at right angles to the sections. If the sections 10, 11 and 12 are made up of a plurality of sections, each of the sections may be provided with a tab at each end and the support S may be provided with a corresponding number of grooves 15 and clips 16 so that each of the sections of the map is detachably supported on and connected to the support S.

The construction described above greatly facilitates the preparation of world maps and is sufficiently accurate for substantially all purposes. By using standard types of projections, the individual sections of the map will have only slight inaccuracies, for example, the Lambert conformal conic projections with two standard parallels will have a maximum inaccuracy of not over 3½%. This error does not exceed appreciably the errors in drafting by the cartographer and the errors introduced by expansion and contraction of the paper base. Therefore, the projection inaccuracies are of little consequence and my maps are sufficiently accurate for all scientific and educational purposes. Moreover, maps of the type embodying the present invention are inexpensive to manufacture for the reason that the map sections may be printed in very large numbers and may be assembled with a minimum of skill thereby greatly reducing the cost of each map. Because of the small cost of the individual map sections and their ease of attachment to and detachment from the support S, data may be plotted directly upon such maps and when changes need be made the previously marked sections may be detached and new sections having newly plotted data thereon may be readily applied to the support. The advantage of such a construction to meteorologists who prepare as many as three and four sets of data per day will be apparent.

While the present invention has been illustrated as having each of the hemispheres represented by three conic sections, it will be understood that two or more than three may be used, if desired. Moreover, the size of the map is limited only by the requirements of the user thereof and therefore such globe maps may be either small or large as the purpose demands. Therefore, the form of the invention described above should be considered as illustrative only and not as limiting the scope of the following claim.

I claim:

A globe map comprising a supporting member, having its surface formed to represent two hemispheres, each hemisphere being formed of at least two coaxial conic sections, at least four map sections corresponding to developments of said conic sections, each strip having a conic projection on two standard parallels of a corresponding portion of a world map printed thereon and being adapted to be mounted on the surface of said support, at least one groove in the surface of said supporting member extending parallel to a meridian and means in said groove for engaging and retaining the ends of each map section in said groove.

ALLAN C. CLARK.